(12) United States Patent
Takamatsu et al.

(10) Patent No.: US 7,816,029 B2
(45) Date of Patent: Oct. 19, 2010

(54) BATTERY MODULE

(75) Inventors: Toshifumi Takamatsu, Sagamihara (JP); Tomonori Tazuke, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 586 days.

(21) Appl. No.: 11/764,392

(22) Filed: Jun. 18, 2007

(65) Prior Publication Data

US 2008/0057392 A1    Mar. 6, 2008

(30) Foreign Application Priority Data

Aug. 31, 2006    (JP)    .............................. 2006-236576

(51) Int. Cl.
*H01M 6/46*    (2006.01)

(52) U.S. Cl. ........................ 429/152; 429/149; 429/153; 429/154

(58) Field of Classification Search .................. 429/152
See application file for complete search history.

(56) References Cited

U.S. PATENT DOCUMENTS

| 5,824,199 A | 10/1998 | Simmons et al. |
| 2003/0104263 A1 | 6/2003 | Molter et al. |
| 2004/0021442 A1 | 2/2004 | Higashino |
| 2005/0064267 A1 | 3/2005 | Guttermann et al. |
| 2005/0069759 A1* | 3/2005 | Shimamura et al. ........... 429/53 |
| 2005/0118486 A1 | 6/2005 | Strobel et al. |

FOREIGN PATENT DOCUMENTS

| DE | 10203612 C1 | 6/2003 |
| EP | 1174942 A1 | 1/2002 |
| JP | 2005-108693 A | 4/2005 |
| JP | 2006-092884 A | 4/2006 |
| WO | WO-03/044886 A2 | 5/2003 |

* cited by examiner

*Primary Examiner*—Dah-Wei D Yuan
*Assistant Examiner*—Patricia Davis
(74) *Attorney, Agent, or Firm*—Global IP Counselors, LLP (57) ABSTRACT

A battery module is provided with a battery cell stack and a module case. The battery cell stack includes a plurality of stacked flat secondary battery cells. The module case includes an inwardly protruding section, a low rigidity section and a high rigidity section. The inwardly protruding section is disposed on at least one of two oppositely facing sides of the module case that faces in a battery cell stacking direction and protruding toward the interior area of the module case to apply pressure to an end surface of the battery cell stack. The low rigidity section elastically supports a periphery of the inwardly protruding section due the low rigidity section having a lower rigidity than the inwardly protruding section. The high rigidity section supports a periphery of the low rigidity section with the high rigidity section having a higher rigidity than low rigidity section.

17 Claims, 5 Drawing Sheets

BATTERY MODULE

CROSS-REFERENCE TO RELATED APPLICATIONS

This application claims priority to Japanese Patent Application No. 2006-236576, filed on Aug. 31, 2006. The entire disclosure of Japanese Patent Application No. 2006-236576 is hereby incorporated herein by reference.

BACKGROUND OF THE INVENTION

1. Field of the Invention

The present invention generally relates to a battery module having a battery cell stack that is made up of a plurality of flat batteries stacked on one another and enclosed inside a case.

2. Background Information

In recent years, the idea of using a battery module (e.g., Japanese Laid-Open Patent Publication No. 2005-108693) as an electric power source for an electric car or a hybrid car is being considered. A battery module comprises a plurality of flat battery cells that are stacked in the thickness direction so as to form a battery cell stack and enclosed inside a case (hereinafter called "module case"). Each of the flat battery cells of the battery cell stack comprises an electric power supplying element that has been sealed along with a liquid electrolyte inside a laminating film or other sheet-like exterior material. The electric power supplying elements each comprise positive electrode plates and negative electrode plates (hereinafter called "electrode plates") that have been stacked on one another.

In view of the above, it will be apparent to those skilled in the art from this disclosure that there exists a need for an improved battery module. This invention addresses this need in the art as well as other needs, which will become apparent to those skilled in the art from this disclosure.

SUMMARY OF THE INVENTION

It has been discovered that in the kind of battery module described above, a gas is generated inside the flat battery cells during charging and discharging and the performance of the battery will decline if the gas accumulates between the electrode plates of the electric power supplying elements. In order to prevent the accumulation of gas, the battery module described in Japanese Laid-Open Patent Publication No. 2005-108693 has an inwardly protruding section provided on the module case. The inwardly protruding section is a portion of the module case that has been deformed so as to bulge inward toward the inside of the module case. The inwardly protruding section applies pressure against an end surface of the battery cell stack that faces in the stacking direction, and thereby, prevents gas from accumulating between the electrode plates of the electric power supplying elements inside the flat battery cells.

However, when the module case is made of a thinner plate-like material in order to reduce the weight and/or make the module case easier to form into the desired shape, the rigidity of the inwardly protruding section decreases and the inwardly protruding section tends to deform in accordance with the contour of battery surface. Consequently, it is difficult to apply an appropriate surface pressure to the battery.

The present invention was conceived for the purpose of resolving the problems described above and its object is to provide a battery module that can prevent to the greatest degree possible the battery performance from being affected (degraded) by the gas produced as a result of charging and discharging the battery cells constituting the battery cell stack.

A battery module in accordance with the present invention basically comprises a battery cell stack and a module case. The battery cell stack includes a plurality of stacked flat secondary battery cells along in a thickness direction of the flat secondary battery cells. Each of the flat secondary battery cells includes an electric power supplying element with a positive electrode plate and a negative electrode plate stacked on one another and sealed inside a sheet-like exterior material. The module case encloses the battery cell stack within an interior area of the module case. The module case includes an inwardly protruding section, a low rigidity section and a high rigidity section. The inwardly protruding section is disposed on at least one of two oppositely facing sides of the module case that faces in a battery cell stacking direction and protruding toward the interior area of the module case to apply pressure to an end surface of the battery cell stack that faces in the battery cell stacking direction. The low rigidity section elastically supports a periphery of the inwardly protruding section due the low rigidity section having a lower rigidity than the inwardly protruding section. The high rigidity section supports a periphery of the low rigidity section with the high rigidity section having a higher rigidity than low rigidity section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
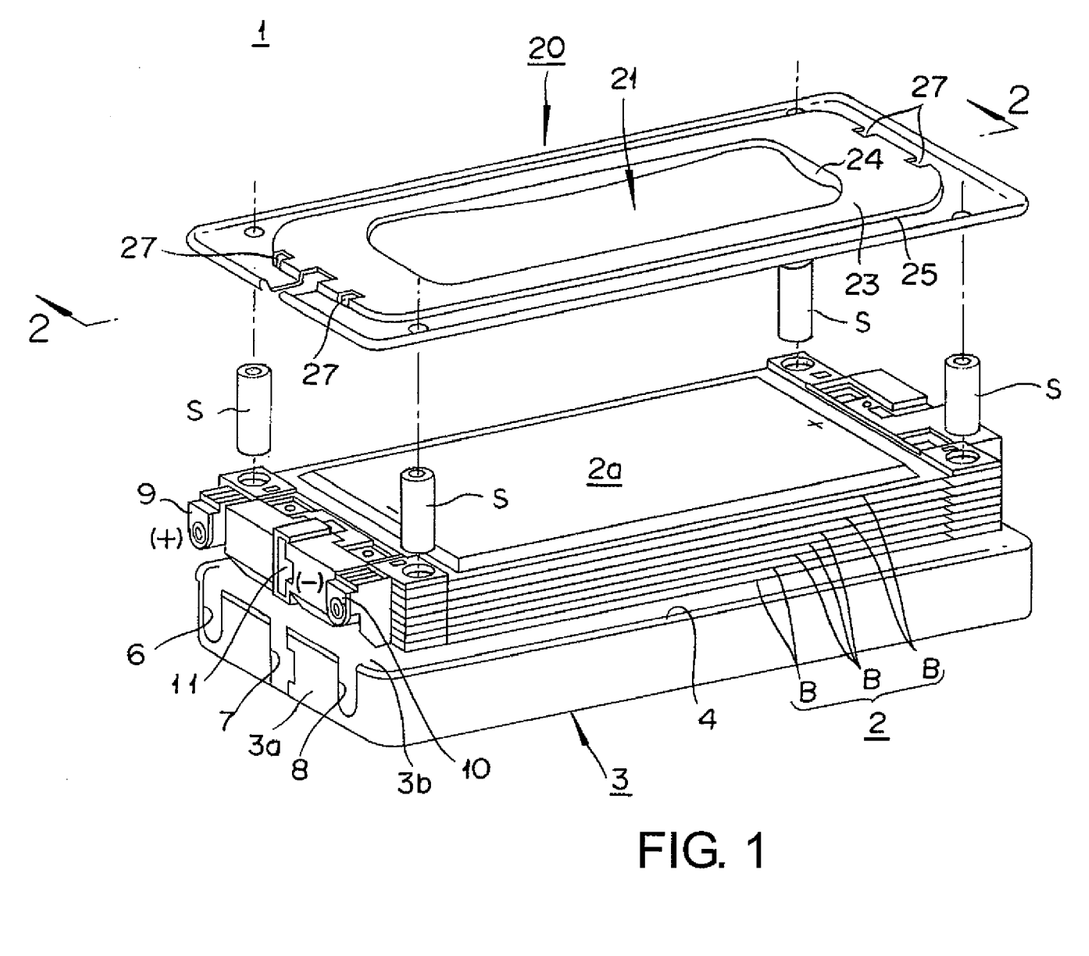
FIG. 1 is an exploded perspective schematic view of a battery module in accordance with one embodiment of the present invention.

Referring initially to FIG. 1, a battery module is illustrated in accordance with a first embodiment of the present invention. As shown in FIG. 1, the battery module in this embodiment has a module case 1 and a battery cell stack 2 contained therein. The module case 1 includes a case main body 3 with an opening 4 in an upper portion thereof and a lid member 20 serving to block the opening 4. The case main body 3 and the lid member 20 are joined together by seam folding (folding the edges together) to form the module case 1. The battery cell stack 2 includes a plurality of flat battery cells B stacked on one another in the thickness direction thereof and contacted with each other in the stacked direction. The battery cell stack 2 is enclosed inside the module case 1 to form the battery module. The module case 1 is configured to reliably prevent the performance of the battery cell stack 2 from declining as a result of gas generated in the electric power supplying elements of the battery.

Figure 7:
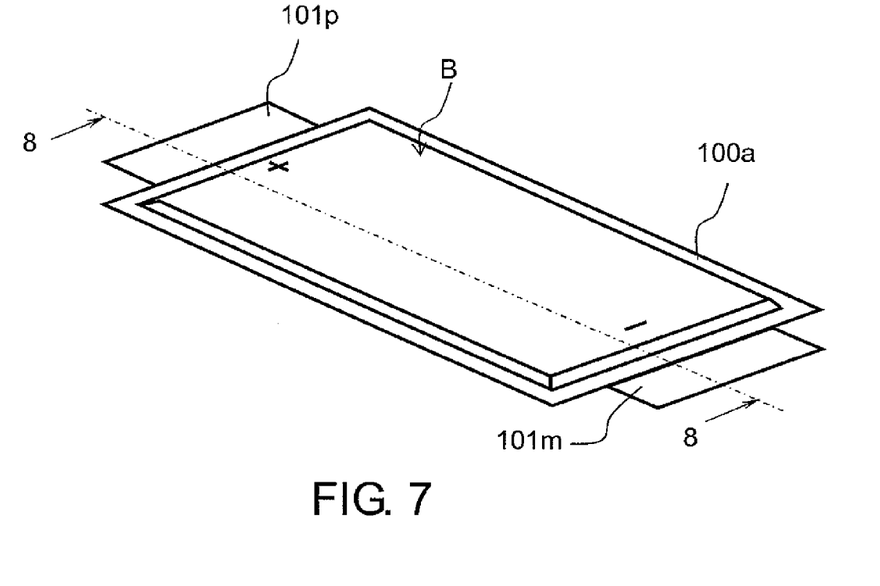
FIG. 7 is a perspective view of a battery cell (flat battery cell) that shows the shape and structure of the battery cell.
Figure 8:
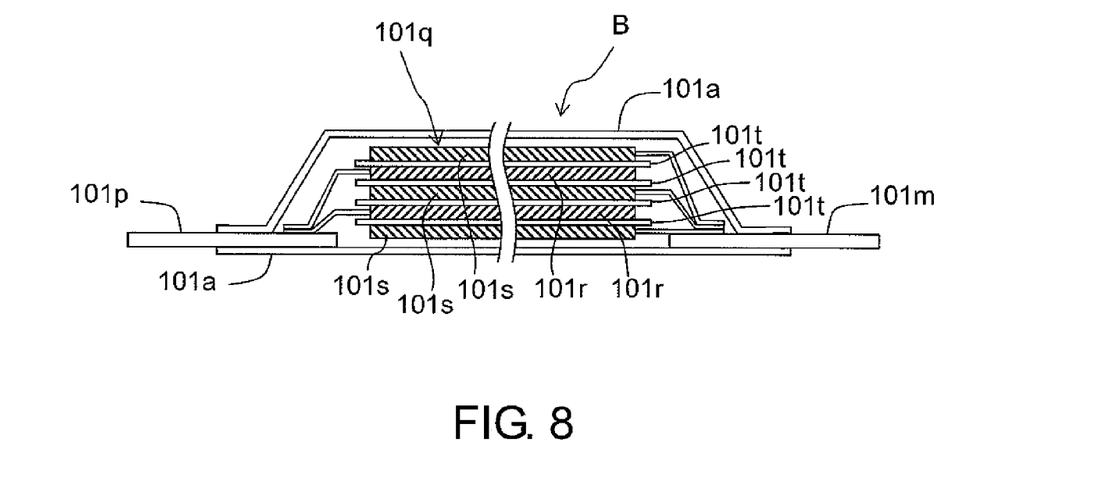
FIG. 8 is a longitudinal cross sectional view of the battery cell as seen along section line 8-8 of FIG. 7.

FIG. 7 shows the external appearance of a flat battery cell B (hereinafter called simply "battery cell") and FIG. 8 shows a cross sectional view of the same taken along the section line 8-8 of FIG. 7. The battery cell B has a sack-like cell exterior 100a made of a sheet-like material 101a. The sheet-like material 101a is a laminate film made of layers of a metal foil and a resin film. An electric power supplying element comprising positive electrode plates 101r (hereinafter called "positive plates"), negative electrode plates 101s (hereinafter called "negative plates"), and separators 101t stacked on one another is sealed inside the cell exterior 100a along with a liquid electrolyte (not shown). The battery cell B is rectangular in a top plan view. A positive terminal 101p is electrically connected to the positive plates 101r inside the battery cell B. A negative terminal 101m is electrically connected to the negative plates 101s inside the battery cell B. The positive terminal 101p and the negative terminal 101m are arranged to extend to the outside of the cell exterior 100a. The battery cells B are stacked on one another along the thickness direction thereof and the positive terminal 101p of each battery cell B is connected to the negative terminals 101m of the adjacent battery cells B (and vice versa) such that the battery cells B are connected together in series. The result is a battery cell stack 2 like that shown in FIG. 1.

Figure 2:
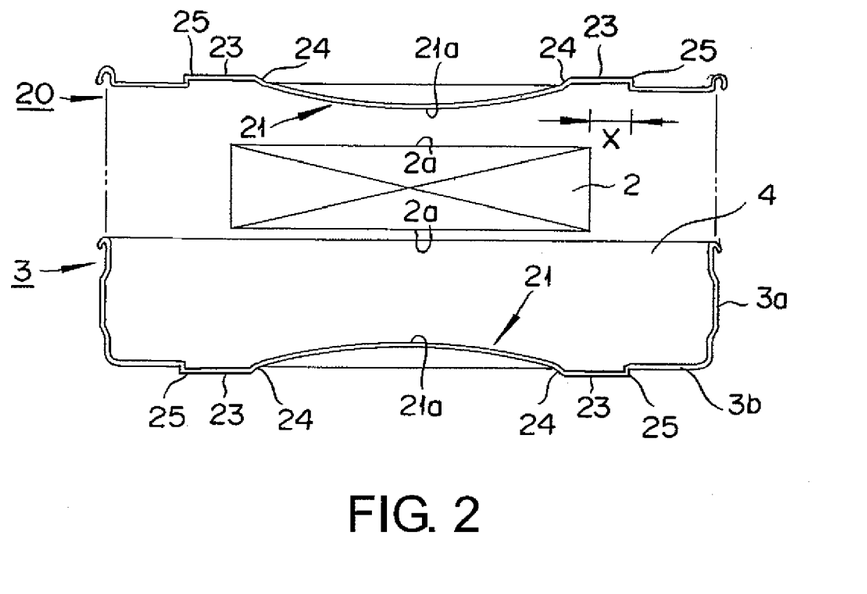
FIG. 2 is a schematic longitudinal cross sectional view as seen along the section line 2-2 of FIG. 1.

As shown in FIGS. 1 and 2, the case main body 3 is generally box shaped that includes a side panel section 3a, a bottom panel section 3b, and an open upper side constituting an opening 4. The side panel section 3a has a plurality of notches 6, 7 and 8 provided in a short side of the side panel section 3a. The notch 6 is accommodates a positive terminal 9. The positive terminal 9 is connected to the positive terminal of the battery cell B that is at the highest electric potential among the battery cells B of the battery cell stack 2. The notch S accommodates a negative terminal 10 that is connected to the negative terminal of the battery cell B. The negative terminal 10 has the lowest electric potential among the battery cells B of the battery bell stack 2. The notch 7 is accommodates a receptacle 11 for a connector (not shown) that connects to a controller (not shown). The connector enables the controller to detect the voltages of the battery cells B in order to control the charging and discharging of the battery module.

As shown in FIGS. 1 and 2, the lid member 20 is formed to correspond to the shape of the opening 4 of the case main body 3. The outer edge of the lid member 20 is folded together with the side panel section 3a of the case main body 3 to seal the opening 4 of the case main body 3 and complete the module case 1.

The case main body 3 and the lid member 20 are made of an aluminum alloy sheet metal the surface of which has been coated with a PET resin film or other resin with an electrically insulating quality. The aluminum alloy sheet metal is aluminum 5052 with a thickness of 0.5 mm and the PET resin film has a thickness of approximately 20 micrometers.

As shown in FIGS. 1 and 2, the lid member 20 and the bottom panel 3b of the case main body 3 are each provided with an inwardly protruding section 21 that protrudes toward the inside of the module case 1 so as to apply pressure to an end surface 2a of the battery cell stack 2 that faces in the battery cell stacking direction. A low rigidity section is provided around the periphery of the inwardly protruding section 21 to support the inwardly protruding section 21 in an elastic fashion. A high rigidity section is connected to the low rigidity section. The high rigidity section has a higher rigidity than low rigidity section.

Figure 4:
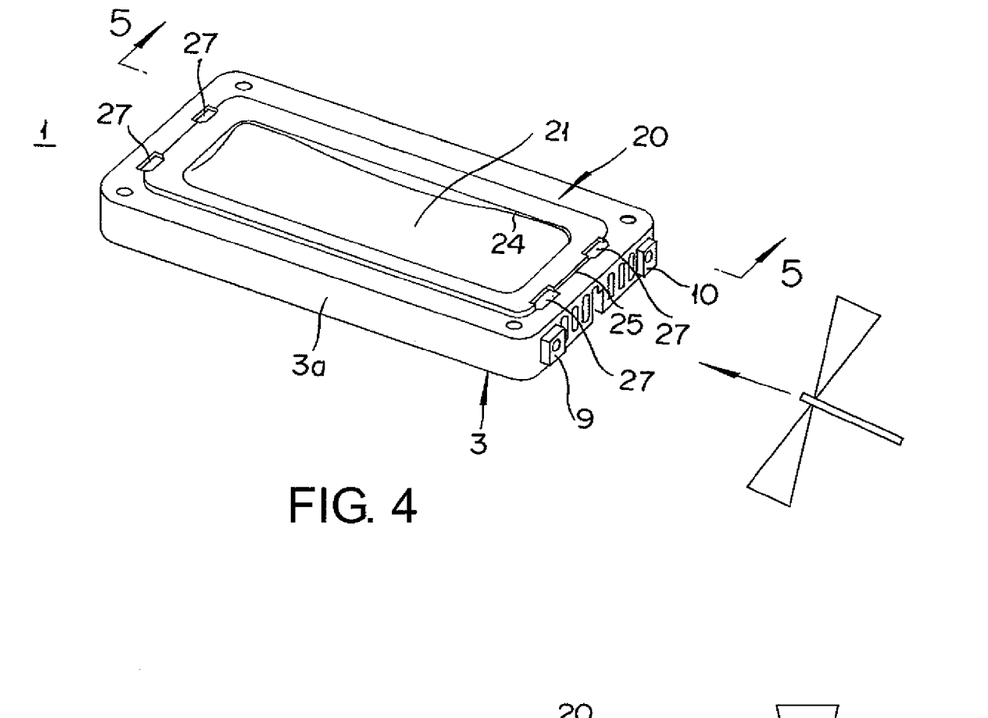
FIG. 4 is a schematic perspective view showing the assembled state of the module.

Each of the inwardly protruding sections 21 is configured to press strongly against a center portion of the respective end surface 2a of the battery cell stack 2 and does not press against the inward entire end surface 2a uniformly. Therefore, each inwardly protruding section 21 has a chamfered shape that is slightly smaller than the outside perimeter of the battery cell stack 2. As shown in FIGS. 1, 2, and 4, the chamfer shape is curved in a cross sectional view so as to be recessed in the middle.

The low rigidity section serves to make it easier for the inwardly protruding section 21 to move with respect to the battery cell stack 2 while maintaining its chamfered shape when it is pressed against the end surface 2a of the battery cell stack 2. In this embodiment, an area surrounding the inwardly protruding section 21 protrudes outward to form a flat section 23 around the perimeter of the inwardly protruding section 21 and a step-like section 25 around the perimeter of the flat section 23. The flat section 23 functions as the low rigidity section and the step-like section 25 functions as the high rigidity section.

More specifically, the inwardly protruding section 21 has the shape of a curved surface that bulges toward the inside of the module case. The flat section 23 has the shape of a flat surface that is substantially parallel to the end surface 2a of the battery cell stack 2. Consequently, the flat section 23 constitutes a low rigidity section that has a lower surface rigidity than the inwardly protruding section 21 and undergoes elastic deformation more readily in reaction to the force exerted by the battery cell stack 2 when the end surface 2a of the battery cell stack 2 is pressed by the inwardly protruding section 21. In short, the low rigidity section supports the inwardly protruding section 21 in an elastic manner.

Meanwhile, the step-like section 25 has the form of a surface that is arranged at an angle with respect to the end surface 2a of the battery cell stack 2 (preferably, the step-like section 25 is substantially perpendicular to the end surface 2a of the battery cell stack 2). As a result, the step-like section 25 constitutes a high rigidity section that is more rigid than the flat section 23 with respect to the force exerted by the battery cell member 2 and, thus, deforms less readily in response to said force. The high rigidity section is connected to the low rigidity section and, thus, supports the low rigidity section.

With the sheet metal formed in the outwardly protruding manner just described, a space 26 is formed inside the module case 1 (i.e., between the module case 1 and the battery cell stack 2). The existence of this space 26 around the outside perimeter of the battery cell stack 2 makes it more difficult for heat generated by charging and discharging of the battery cell stack 2 to be transferred to the module case 1 and reduces the amount of electricity discharged through the module case 1.

Therefore, as will be described in more detail later, the ventilation openings 27 (through holes) are provided so that cooling air can be introduced into the module case 1 from the outside so as to cool the battery cell stack 2.

The flat section 23 and the battery cell stack 2 are arranged such that the outer periphery of the end surface 2a of the battery cell stack 2 is aligned with the flat section 23. In other words, by arranging the flat section 23 and the battery cell stack 2 such that a prescribed distance X exists between the outside edge of the battery cell stack 2 and the step-like section 25, it is possible to prevent the occurrence of a collision between the battery cell stack 2 and a corner portion of the step-like section 25 on the inside of the module case 1.

Figure 3:
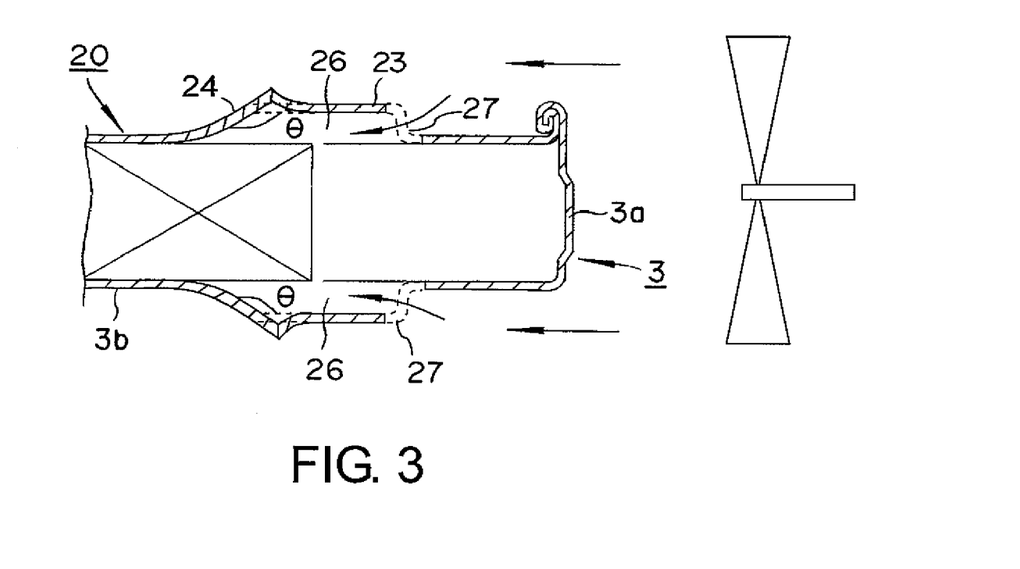
FIG. 3 is an enlarged cross sectional view illustrating key features during assembly.

As shown in FIG. 3, the interior angle θ between an outer edge section 24 of the inwardly protruding section 21 and the flat section 23 is an obtuse angle. As a result, it is easier for the angle between the outer edge section 24 of the inwardly protruding section 21 and the flat section 23 to transform (change) when the lid member 20 is attached to the case main body 3 by folding the edges thereof together. Thus, when the lid member 20 is attached and the belly surface 21a of the inwardly protruding section 21 is pressed against a middle portion of the end surface 2a of the battery cell stack 2, the chamfered shape of the inwardly protruding section 21 can be maintained and the middle portion of the end surface 2a of the battery cell stack 2 can be pressed in a reliable manner. As a result, the accumulation of gas between the electrodes of the electric power supplying element can be prevented and the decline in performance of the battery cells B that results from gas accumulation can be suppressed. The phrase "maintain (hold) the chamfered shape" as used herein does not mean that the shape does not change at all, but rather, that the chamfered shape does not change so much that the inwardly protruding section 21 presses against the entire end surface 2a of the battery cell stack 2 and loses its ability to press against the middle portion of the end surface 2a in a reliable manner. In other words, the chamfered shape is allowed to deform slightly within such a range that ability to press against the middle portion of the end surface 2a in a reliable manner is not lost.

After the lid member 20 is attached to the case main body 3 such that the battery cell stack 2 is enclosed inside the module case 1, any external force (e.g., vibration of the vehicle) acting on the module case 1 can be substantially absorbed by absorbed solely by the flat section 23 and the corner portion between the flat section 23 and the outer edge section 24 of the inwardly protruding section 21. As a result, the chamfered shape of the inwardly protruding section 21 can be maintained at all times, the middle portion of the battery cell stack 2 can be pressed reliably, and the ability of the case module 1 to remove gas from between the electrodes of the electric power supplying elements can be prevented from declining.

Figure 5:
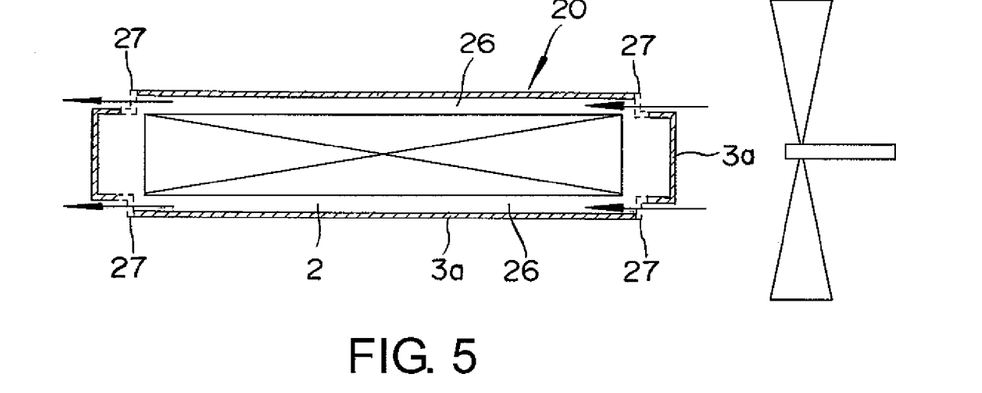
FIG. 5 is a longitudinal cross sectional view as seen along section line 5-5 of FIG. 4.

As shown in FIGS. 3, 4, and 5, the outer periphery of the flat section 23 is provides with the ventilation openings 27. Preferably, the ventilation openings 27 are provided in the step-like section 25 on the outer periphery of the flat section 23. Although there is the possibility that the space 26 will inhibit the transfer of heat from the battery cell stack 2 to the module case 1, the existence of an appropriate number ventilation openings 27 in this embodiment allows cooling air flowing along the outside of the module case 1 (in direction of arrows) to enter the module case 1, pass through the space 26, and return to the outside. As a result, the heat generated by the electric power supplying elements of the battery cells during charging and discharging (i.e., the heat emitted from the battery cell stack 2) can be removed. The ventilation openings 27 can be provided anywhere along the step-like section 25, but it is preferable to provide them in positions located upstream and downstream relative to the flow direction of the cooling air.

Even if cooling air is not delivered to the ventilation openings 27, heat inside the module case 1 can be dispersed through the ventilation openings 27 Therefore, it may not be necessary to deliver cooling air to the inside of the module case 1 through the ventilation openings 27 if the amount of heat emitted from the battery cell stack 2 inside the module case 1 is sufficiently small.

The operational effects of the embodiment will now be explained.

Figure 6:
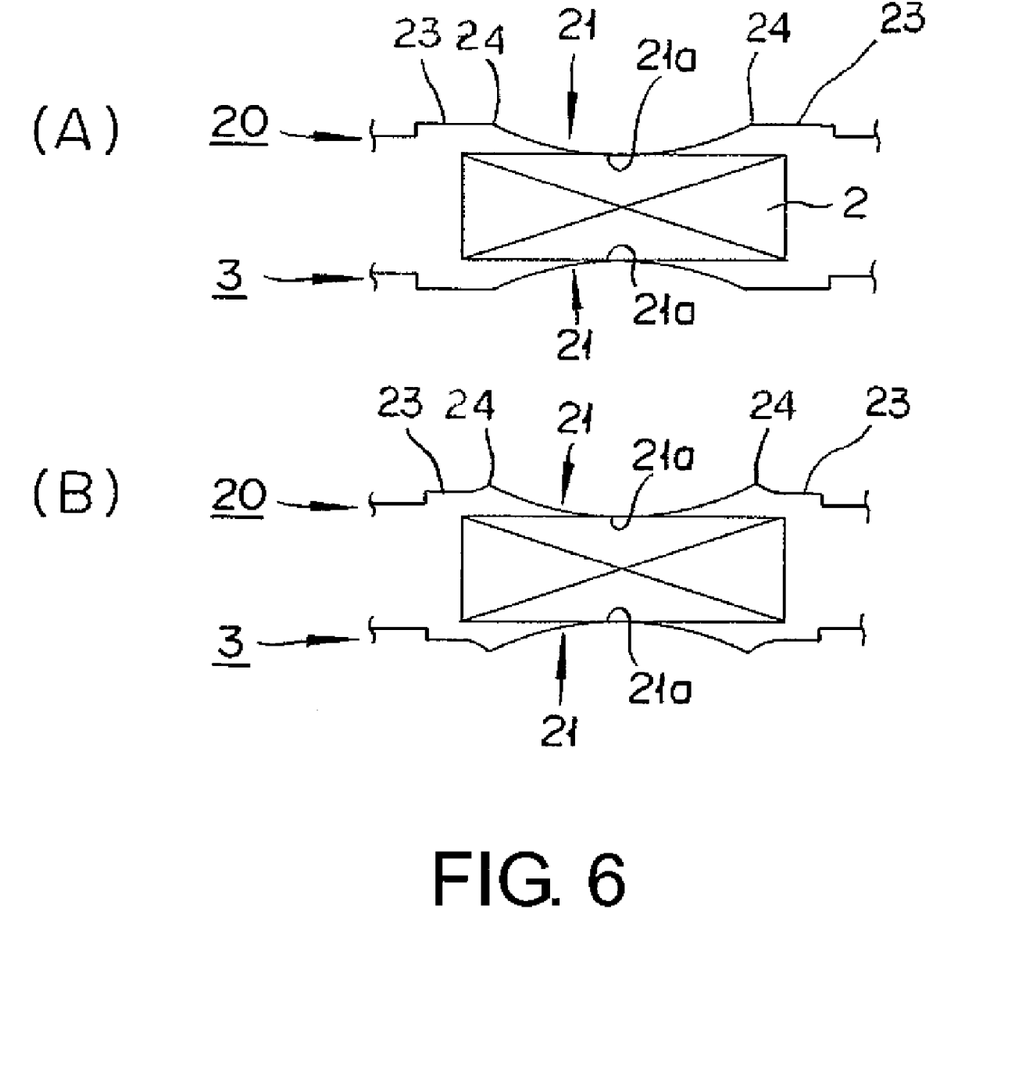
FIG. 6 is a pair of simplified diagrammatic illustrations with illustration (A) illustrates the relationship between the battery cell stack and the inwardly protruding sections when the battery cell stack is initially arranged inside the module case, and illustration (B) illustrates the relationship between the battery cell stack and the inwardly protruding sections after the lid member has been attached to the case main body by folding the edges thereof together.

FIG. 6 illustrates the relationship between the battery cell stack 2 and the inwardly protruding sections 21. Illustration (A) of FIG. 6 shows the state when the battery cell stack 2 is initially arranged inside the module case 1. Illustration (B) of FIG. 6 shows the state after the lid member 20 has been attached to the case main body 3 by folding the edges thereof together.

The battery cells B (flat batteries) are stacked on one another in the thickness direction thereof and electrically connected together in series to form the battery cell stack 2. After a positive terminal 9, a negative terminal 10, and a connected 11 are attached to the battery cell stack 2, the battery cell stack 2 is placed inside the case main body 3. The lid member 20 is then placed on top so as to block the opening 4 of the case main body 3 (see, illustration (A) of FIG. 6).

The edge portion of the side panel section 3a of the case main body 3 (i.e., the edge of the opening 4) and the outside edge portion of the lid member 20 are folded together such that they are coupled together. As a result, as shown in illustration (B) of FIG. 6, the belly surfaces 21a of the chambered inwardly protruding sections 21 are pressed against middle portions of the end surfaces 2a of the of the battery cell stack 2. As shown in FIG. 1, spacers S can be used to provide a certain degree of adjustment to the forces that the inwardly protruding sections 21 apply to the middle portions of the end surfaces 2a of the battery cell stacks 2.

Thus, the battery cell stack 2 is pinched between the inwardly protruding sections 21 of the lid member 20 and the bottom panel section 3b of the case main body 3 and gas generated during charging and discharging of the battery cell stack 2 is pushed to the outside instead of accumulating between the electrodes of the electric power supplying elements. As a result, the generated gas does not degrade the performance of the battery.

When an external force acts on the battery module due to vibration or another cause, it is the flat sections 23 of the module case 1 or the portions around surrounding the perimeter of the flat sections 23 that undergo deformation because the battery cell stack 2 is supported in an elastic fashion by the flat sections 23 (low rigidity section). Meanwhile, the chamfered shapes of the inwardly protruding sections 21 are maintained at all times and the ability to discharge gas from between the electrodes of the electric power supplying elements does not decline.

Since the interior angle θ between the outer edge section 24 of the inwardly protruding section 21 and the flat section 23 is obtuse, any stress that develops in the inwardly protruding section 21 due to the reaction force exerted by the battery cell stack 2 against the inwardly protruding section 21 as a result of the pressure there-between or due to the action of vibration of the entire module case 1 can be absorbed through elastic deformation of the flat section 23 and transformation of the angle between the outer edge section 24 of the inwardly protruding section 21 and the flat section 23. As a result, damage to the battery cell stack 2 can be prevented.

As mentioned above, a force exerted against one of the inwardly protruding sections 21 of the module case 1 by the battery cell stack 2 can be substantially absorbed by elastic deformation of the flat section 23 and transformation of the angle between the outer edge section 24 of the inwardly protruding section 21 and the flat section 23. Thus, when the battery cell stack 2 exerts a reaction force against the lid member 20, the resulting deformation can be prevented from spreading beyond (to the outside of) the step-like section 25 (high rigidity section). As a result, deformation of the portions where the outside edge of the lid member 20 and the case main body 3 join together can be prevented and, thus, damage to the joint between the lid member 20 and the case main body 3 can be prevented.

In this embodiment, the outer edge of the lid member 20 and the case main body 3 are joined together with a folded seam, i.e., but folding the edges together. A folded seam joint affects the battery cell stack 2 inside the module case 1 less than a welded joint or other joint that requires the application of heat. On the other hand, the joint strength of a folded seam is more likely to be affected by deformation than a welded seam. Since forces exerted by the battery cell stack 2 against the inwardly protruding sections 21 of the module case 1 are absorbed by means of elastic deformation of the flat section 23 and transformation of the angle between the outer edge section 24 of the inwardly protruding section 21 and the flat section 23, the possibility of the joint between the lid member 20 and the case main body 3 being adversely affected can be reduced.

Cooling air is blown along the exterior of the module case 1 by a device such as a fan shown in FIGS. 3 to 5. As shown in FIGS. 4 and 5, the cooling air enters the module case 1 through the ventilation openings 27 provided on the upstream side of the module case 1 (in the step-like section 25 that protrudes from the flat surface of the module case 1). The cooling air then flows through the space 26 inside the module case 1 and out through the ventilation openings 27 provided on the downstream side of the module case 1. As a result, the battery cell stack 2 is cooled directly. This cooling suppresses the temperature of the battery cell stack 2 and, thereby, prevents the battery performance from declining due to high temperatures.

The present invention is not limited to the embodiment described heretofore. Various modifications can be made within the scope of the claims. For example, in the embodiment the low rigidity section comprises a flat section 23, but there are other configurations that can be adopted to achieve the low rigidity section. For example, the outer edge portion of the inwardly protruding section 21 of the module case 1 can be made with a thinner wall thickness in order to lower the rigidity if the outer edge portion. It is also acceptable to make the outer edge portion of the inwardly protruding section 21 have a bellows-like form. In short, any configuration is acceptable so long as said outer edge portion deforms readily when the battery cell stack 2 exerts a force oriented in the battery cell stacking direction against the inwardly protruding section 21. However, it is preferable to configure the low rigidity section as a flat section 23 (as described in the previously described embodiment) because the forming process of the lid member 20 becomes complex when wall thickness of the lid member 20 is varied or a portion of the lid member 20 is formed in a bellows-like manner.

Likewise, although the high rigidity section comprises a step-like section 25 in the previously described embodiment, there are other configurations that can be adopted to achieve the high rigidity section. For example, if the amount of heat emitted from the battery cell stack 2 is small and it is not necessary to provide ventilation openings 27, then the high rigidity section can be realized by increasing the wall thickness of the outer edge of the flat section 23 (low rigidity section) of the module case 1 or by attaching another member (e.g., a reinforcing member) to an outer edge portion of the flat section 23. However, it is preferable to configure the high rigidity section as a step-like section 25 (as described in the previously described embodiment) because the forming process of the lid member 20 becomes complex when wall thickness of the lid member 20 is varied at the outside edge of the flat section 23 (i.e., the low-rigidity section) and the cost and weight could increase if a separate member (reinforcing member) is attached to the lid member 20.

In the previously described embodiment, the lid member 20 and the bottom panel section 3*a* of the case main body 3 are each provided with an inwardly protruding section 21, a flat section 23, and a step-like section 25. However, the invention is not limited to this configuration and it is acceptable for only the lid member 20 or only the bottom panel section 3*b* to be provided with these features.

Thus, while only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery module comprising:
    a battery cell stack including a plurality of flat secondary battery cells stacked along in a thickness direction which is a battery cell stacking direction of the flat secondary battery cells, each of the flat secondary battery cells including an electric power supplying element with a positive electrode plate and a negative electrode plate stacked on one another and sealed inside a sheet-like exterior material; and
    a module case enclosing the battery cell stack within an interior area of the module case, the module case including
        an inwardly protruding section disposed on at least one of two oppositely facing sides of the module case that faces in the battery cell stacking direction and protruding toward the interior area of the module case with the inwardly protruding section pressing an end surface of the battery cell stack that faces in the battery cell stacking direction at a point disposed inward from an edge of the battery cell stack, a first rigidity section elastically supporting a periphery of the inwardly protruding section with the first rigidity section having a lower rigidity than the inwardly protruding section, and a second rigidity section supporting a periphery of the first rigidity section with the second rigidity section having a higher rigidity than the first rigidity section.

2. The battery module recited in claim 1, wherein the inwardly protruding section has a curved surface bulging toward the interior area of the module case.

3. A battery module comprising:

a battery cell stack including a plurality of flat secondary battery cells stacked along in a thickness direction which is a battery cell stacking direction of the flat secondary battery cells, each of the flat secondary battery cells including an electric power supplying element with a positive electrode plate and a negative electrode plate stacked on one another and sealed inside a sheet-like exterior material; and a module case enclosing the battery cell stack within an interior area of the module case, the module case including an inwardly protruding section disposed on at least one of two oppositely facing sides of the module case that faces in the battery cell stacking direction and protruding toward the interior area of the module case to apply pressure to an end surface of the battery cell stack that faces in the battery cell stacking direction, a first rigidity section elastically supporting a periphery of the inwardly protruding section with the first rigidity section having a lower rigidity than the inwardly protruding section, and a second rigidity section supporting a periphery of the first rigidity section with the second rigidity section having a higher rigidity than the first rigidity section, the first rigidity section being a flat section that adjoins the periphery of the inwardly protruding section and that extends parallel to the end surface of the battery cell stack, and the second rigidity section being a step-like section that is formed by bending a portion of the module case around the periphery of the flat section toward the battery cell stacking direction and lies in a plane that is angled with respect to the end surface of the battery cell stack.

4. The battery module recited in claim 3, wherein the flat section aligns with an edge portion of the battery cell stack along a direction perpendicular to the battery cell stacking direction.

5. The battery module recited in claim 3, wherein the inwardly protruding section and the flat section are arranged to define an interior obtuse angle therebetween.

6. The battery module recited in claim 1, wherein the module case includes a case main body with an opening that faces in the battery cell stacking direction and a lid member closing the opening of the case main body, a peripheral edge of the lid member being joined to an edge of the case main body that defines the opening of the case main body.

7. The battery module recited in claim 6, wherein the peripheral edge of the lid member is joined to the edge defining the opening of the case main body by folding the edges together.

8. The battery module recited in claim 6, wherein the inwardly protruding section, the first rigidity section, and the second rigidity section are at least partially formed on the lid member.

9. The battery module recited in claim 3, wherein the step-like section has at least one through hole that communicates the interior area of the module case with outside of the module case.

10. The battery module recited in claim 9, wherein the at least one through hole is arranged in the module case such that a flow of cooling air supplied to an external surface of the module case enters the module case via the through hole.

11. The battery module recited in claim 10, wherein the at least one through hole includes an upstream through hole and a downstream through hole relative to a flow direction of the cooling air.

12. The battery module recited in claim 1, wherein the inwardly protruding section is disposed on each of the two oppositely facing sides of the module case that faces in the battery cell stacking direction to apply pressure to the battery cell stack in the battery cell stacking direction.

13. A battery module comprising:

energy storage means for storing electrical energy;

housing means for housing the energy storage means;

pressure applying means for pressing an end surface of the energy storage means at a point disposed inward from an edge of the energy storage means;

elastic means for elastically supporting a periphery of the pressure applying means; and support means for supporting a periphery of the elastic means to the housing means, the support means having a higher rigidity than the elastic means.

14. A battery module comprising:

a battery cell stack including a plurality of flat secondary battery cells stacked along in a thickness direction which is a battery cell stacking direction of the flat secondary battery cells, each of the flat secondary battery cells including an electric power supplying element with a positive electrode plate and a negative electrode plate stacked on one another and sealed inside a sheet-like exterior material; and a module case enclosing the battery cell stack within an interior area of the module case, the module case including an inwardly protruding section disposed on at least one of two oppositely facing sides of the module case that faces in the battery cell stacking direction and protruding toward the interior area of the module case to apply pressure to an end surface of the battery cell stack that faces in the battery cell stacking direction, a first rigidity section elastically supporting a periphery of the inwardly protruding section with the first rigidity section having a lower rigidity than the inwardly protruding section, and a second rigidity section supporting a periphery of the first rigidity section with the second rigidity section having a higher rigidity than the first rigidity section, the second rigidity section being spaced from the inwardly protruding section.

15. A battery module comprising:

a battery cell stack including a plurality of flat secondary battery cells stacked along in a thickness direction which is a battery cell stacking direction of the flat secondary battery cells, each of the flat secondary battery cells including an electric power supplying element with a positive electrode plate and a negative electrode plate stacked on one another and sealed inside a sheet-like exterior material; and a module case enclosing the battery cell stack within an interior area of the module case, the module case including an inwardly protruding section disposed on at least one of two oppositely facing sides of the module case that faces in the battery cell stacking direction and protruding toward the interior area of the module case to apply pressure to an end surface of the battery cell stack that faces in the battery cell stacking direction, a first rigidity section elastically supporting a periphery of the inwardly protruding section with the first rigidity section having a lower rigidity than the inwardly protruding section, and a second rigidity section supporting a periphery of the first rigidity section with the second rigidity section having a higher rigidity than the first rigidity section, the second rigidity section being spaced from the inwardly protruding section.

16. The battery module recited in claim 1, wherein the second rigidity section surrounds the periphery of the first rigidity section.

17. A battery module comprising:

a battery cell stack including a plurality of flat secondary battery cells stacked along in a thickness direction which is a battery cell stacking direction of the flat secondary battery cells, each of the flat secondary battery cells including an electric power supplying element with a positive electrode plate and a negative electrode plate stacked on one another and sealed inside a sheet-like exterior material; and a module case enclosing the battery cell stack within an interior area of the module case, the module case including an inwardly protruding section disposed on at least one of two oppositely facing sides of the module case that faces in the battery cell stacking direction and protruding toward the interior area of the module case to apply pressure to an end surface of the battery cell stack that faces in the battery cell stacking direction, a first rigidity section elastically supporting a periphery of the inwardly protruding section with the first rigidity section having a lower rigidity than the inwardly protruding section, and a second rigidity section supporting a periphery of the first rigidity section with the second rigidity section having a higher rigidity than the first rigidity section, the pressure being applied to the end surface of the battery cell stack by the inwardly protruding section directly contacting and pressing the end surface at a point disposed inward from an edge of the battery cell stack.

* * * * *